(12) United States Patent
Kim et al.

(10) Patent No.: US 12,025,713 B2
(45) Date of Patent: Jul. 2, 2024

(54) METHOD FOR GPS SPOOFING DETECTION WITH GPS RECEIVERS LEVERAGING INACCURACIES OF GPS SPOOFING DEVICES AND APPARATUS THEREFORE

(71) Applicant: Korea Advanced Institute of Science and Technology, Daejeon (KR)

(72) Inventors: Yongdae Kim, Daejeon (KR); Juhwan Noh, Daejeon (KR); Jaehoon Kim, Daejeon (KR); Dohyun Kim, Daejeon (KR); Song Min Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 417 days.

(21) Appl. No.: 16/983,889

(22) Filed: Aug. 3, 2020

(65) Prior Publication Data
US 2021/0364645 A1    Nov. 25, 2021

(30) Foreign Application Priority Data

May 21, 2020  (KR) .......................... 10-2020-0060818
Jul. 16, 2020  (KR) .......................... 10-2020-0087993

(51) Int. Cl.
*G01S 19/21* (2010.01)
*G01S 19/37* (2010.01)
*G06N 20/00* (2019.01)

(52) U.S. Cl.
CPC ............ *G01S 19/215* (2013.01); *G01S 19/37* (2013.01); *G06N 20/00* (2019.01)

(58) Field of Classification Search
CPC .............................. G01S 19/215; G06N 20/00
See application file for complete search history.

(56) References Cited

U.S. PATENT DOCUMENTS 8,934,859 B2 *  1/2015  Dickman ............... H04K 3/65
                                           455/67.11
9,366,762 B2 *  6/2016  Smith ................. G01S 19/215
(Continued)

FOREIGN PATENT DOCUMENTS

KR    10-2019-0065037 A    6/2019

OTHER PUBLICATIONS

M. R. Manesh, J. Kenney, W. C. Hu, V. K. Devabhaktuni and N. Kaabouch, "Detection of GPS Spoofing Attacks on Unmanned Aerial Systems," 2019 16th IEEE Annual Consumer Communications & Networking Conference (CCNC), 2019, pp. 1-6, doi: 10.1109/CCNC.2019.8651804. (Year: 2019).*
(Continued)

*Primary Examiner* — Whitney Moore
(74) *Attorney, Agent, or Firm* — CHRISTENSEN O'CONNOR JOHNSON KINDNESS PLLC

(57) ABSTRACT

A method for detecting a GPS spoofing attack using a difference between output values of a GPS receiver, which is generated due to inaccuracy of a GPS spoofer, and an apparatus therefor are provided. The method includes receiving a GPS signal; and determining the received GPS signal as a GPS satellite signal or a GPS spoofing signal using a learning model learned based on a difference between output values of a GPS receiver. The method further includes labeling and collecting dispersion degree data including a position, a speed, and a time output from the GPS receiver with whether the GPS signal is the GPS satellite signal or the GPS spoofing signal and modeling the learning model using the collected data.

5 Claims, 13 Drawing Sheets

(56) References Cited

U.S. PATENT DOCUMENTS

| | | | | |
|---|---|---|---|---|
| 10,466,700 | B1* | 11/2019 | Carmack | H04K 3/224 |
| 2013/0002477 | A1* | 1/2013 | Dehnie | G01S 19/215 |
| | | | | 342/357.3 |
| 2020/0225358 | A1* | 7/2020 | Kaabouch | G06N 3/0481 |
| 2020/0301021 | A1* | 9/2020 | Odd | H04K 3/22 |
| 2021/0103058 | A1* | 4/2021 | Dries | H04L 41/06 |

OTHER PUBLICATIONS

Shafiee, Ebrahim & Mosavi, M. & Moazedi, Maryam. (2017). Detection of Spoofing Attack using Machine Learning based on Multi-Layer Neural Network in Single-Frequency GPS Receivers. Journal of Navigation. 71. 1-20. 10.1017/S0373463317000558. (Year: 2017).*

S. Semanjski, A. Muls, I. Semanjski and W. De Wilde, "Use and Validation of Supervised Machine Learning Approach for Detection of GNSS Signal Spoofing," 2019 International Conference on Localization and GNSS (ICL-GNSS), 2019, pp. 1-6, doi: 10.1109/ICL-GNSS.2019.8752775. (Year: 2019).*

Borhani-Darian, Parisa, Li, Haoqing, Wu, Peng, Closas, Pau, "Deep Neural Network Approach to Detect GNSS Spoofing Attacks," Proceedings of the 33rd International Technical Meeting of the Satellite Division of The Institute of Navigation (ION GNSS+ 2020), Sep. 2020, pp. 3241-3252. (Year: 2020).*

P. Borhani-Darian and P. Closas, "Deep Neural Network Approach to GNSS Signal Acquisition," 2020 IEEE/ION Position, Location and Navigation Symposium (PLANS), 2020, pp. 1214-1223, doi: 10.1109/PLANS46316.2020.9110205. (Year: 2020).*

Mohsen Riahi Manesh et al, "Detection of GPS Spoofing Attacks on Unmanned Aerial Systems," 16th IEEE Annual Consumer Communication Networking Conference, Jan. 2019, 7 pages.

Silvio Semanjski et al.,, "Use of Supervised Machine Learning for GNSS Signal Spoofing Detection with Validation on Real-World Meaconing and Spoofing Data—Part II," 9th International Conference On Localization and GNSS 2019, Mar. 2020, 15 pages.

Office Action mailed Aug. 25, 2021, from Korean Application No. 10-2020-0087993, filed Jul. 16, 2020, 8 pages.

* cited by examiner

METHOD FOR GPS SPOOFING DETECTION WITH GPS RECEIVERS LEVERAGING INACCURACIES OF GPS SPOOFING DEVICES AND APPARATUS THEREFORE

CROSS-REFERENCE TO RELATED APPLICATIONS

A claim for priority under 35 U.S.C. § 119 is made to Korean Patent Application No. 10-2020-0060818 filed on May 21, 2020, and Korean Patent Application No. 10-2020-0087993 filed on Jul. 16, 2020, in the Korean Intellectual Property Office, the entire contents of which are hereby incorporated by reference.

BACKGROUND

Embodiments of the inventive concept described herein relate to technologies of detecting a global positioning system (GPS) spoofing attack using a difference between output values of a GPS receiver, and more particularly, relate to a method for detecting a GPS spoofing attack using a difference between output values of the GPS receiver and an apparatus therefor.

The GPS, which is a radio navigation system using satellites, has been widely used in a safety-critical system, such as airplanes, ships, trains, power grids, as well as consumer devices, such as smartphones and vehicle navigation systems, because of high accuracy, low cost, and ubiquitous accessibility. Many state-of-the-art functions, such as a location-based smartphone service, autonomous vehicle navigation, and wide-area power grid monitoring, are possible using highly accurate location and timing information capable of being obtained from the GPS. However, such excessive dependence on the GPS increases concerns about the security of GPS. Particularly, studies have proved that a GPS spoofing attack where a position and time of a target GPS receiver is manipulated by an enemy country may threaten the safety of human life and critical infrastructure. For example, ships and drones may be hijacked by the GPS spoofing attack. Furthermore, it has been proven that the party may perform sudden braking of Tesla Model 3 using the GPS spoofing attack to depart from the line. It has been claimed that a GPS spoofing attack on a phasor measurement unit of the power grid may potentially be the cause of power outage.

Some GPS spoofing detection methods such as a space processing method, a signal power monitoring method, and an arrival time identifying method, and a signal quality monitoring method are proposed to it, but all of these technologies are not still applied to a commercial GPS receiver or a GPS-dependent system because there is a need for installing additional hardware such as an antenna or a signal processing device or changing hardware. Thus, most conventional GPS-dependent systems are vulnerable to the GPS spoofing attack.

SUMMARY

Embodiments of the inventive concept provide a method for detecting a GPS spoofing attack using a difference between output values of a GPS receiver and an apparatus therefor.

According to an exemplary embodiment, a method for detecting a GPS spoofing attack may include receiving a GPS signal and determining the received GPS signal as a GPS satellite signal or a GPS spoofing signal using a learning model learned based on a difference between output values of a GPS receiver.

In addition, the method may further include labeling and collecting dispersion degree data including a position, a speed, and a time output from the GPS receiver with whether the GPS signal is the GPS satellite signal or the GPS spoofing signal and learning the learning model using the collected data.

The collecting may include calculating dispersion degree data of a position output of the GPS receiver with respect to the GPS satellite signal and the GPS spoofing signal and collecting an accuracy estimate of the GPS receiver using the calculated dispersion degree data. The learning may include learning the learning model using the collected accuracy estimate.

The learning model may include any one of a multilayer perceptron (MLP) model, an output layer of which is a Softmax layer, a support vector machine (SVM) model, a decision model, and a convolutional neural network (CNN) model.

The determining may include detecting a GPS spoofing attack, when an output value of the learning model for the received GPS signal is greater than a predetermined threshold.

According to an exemplary embodiment, a method for detecting a GPS spoofing attack may include receiving a GPS signal and determining the received GPS signal as a GPS satellite signal or a GPS spoofing signal using a learning model learned based on a difference in signal, the difference being generated due to a characteristic of a signal generation principle of a GPS spoofer.

In addition, the method may further include labeling and collecting dispersion degree data including a position, a speed, and a time output from a GPS receiver with whether the GPS signal is the GPS satellite signal or the GPS spoofing signal; and learning the learning model using the collected data.

According to an exemplary embodiment, an apparatus for detecting a GPS spoofing attack may include a reception unit that receives a GPS signal and a determination unit that determines the received GPS signal as a GPS satellite signal or a GPS spoofing signal using a learning model learned based on a difference between output values of a GPS receiver.

In addition, the apparatus may further include a learning unit that labels and collects dispersion degree data including a position, a speed, and a time output from the GPS receiver with whether the GPS signal is the GPS satellite signal or the GPS spoofing signal and learns the learning model using the collected data.

The learning unit may calculate dispersion degree data of a position output of the GPS receiver with respect to the GPS satellite signal and the GPS spoofing signal, may collect an accuracy estimate of the GPS receiver using the calculated dispersion degree data, and may learn the learning model using the collected accuracy estimate.

The learning model may include any one of a multilayer perceptron (MLP) model, an output layer of which is a Softmax layer, a support vector machine (SVM) model, a decision model, and a convolutional neural network (CNN) model.

The determination unit may detect a GPS spoofing attack, when an output value of the learning model for the received GPS signal is greater than a predetermined threshold.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided so that this disclosure will be through and complete and will fully convey the concept of the invention to those skilled in the art, and the inventive concept will only be defined by the scope of the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of stated components, steps, operations, and/or elements, but do not exclude presence or addition of one or more other components, steps, operations, and/or elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, exemplary embodiments of the inventive concept will be described in detail with reference to the accompanying drawings. The same reference denotations are used for the same components on the drawings, and a duplicated description of the same components will be omitted.

Figure 1:
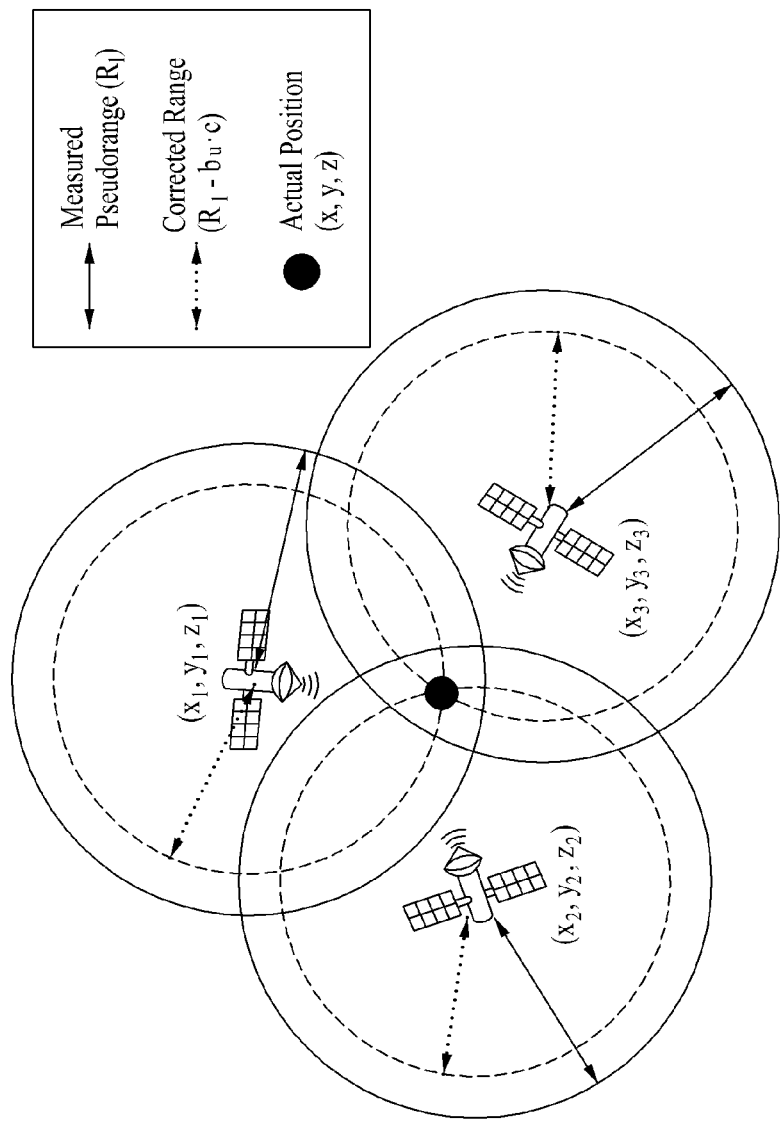
FIG. 1 is a drawing illustrating an example for describing a GPS principle.
Figure 2A:
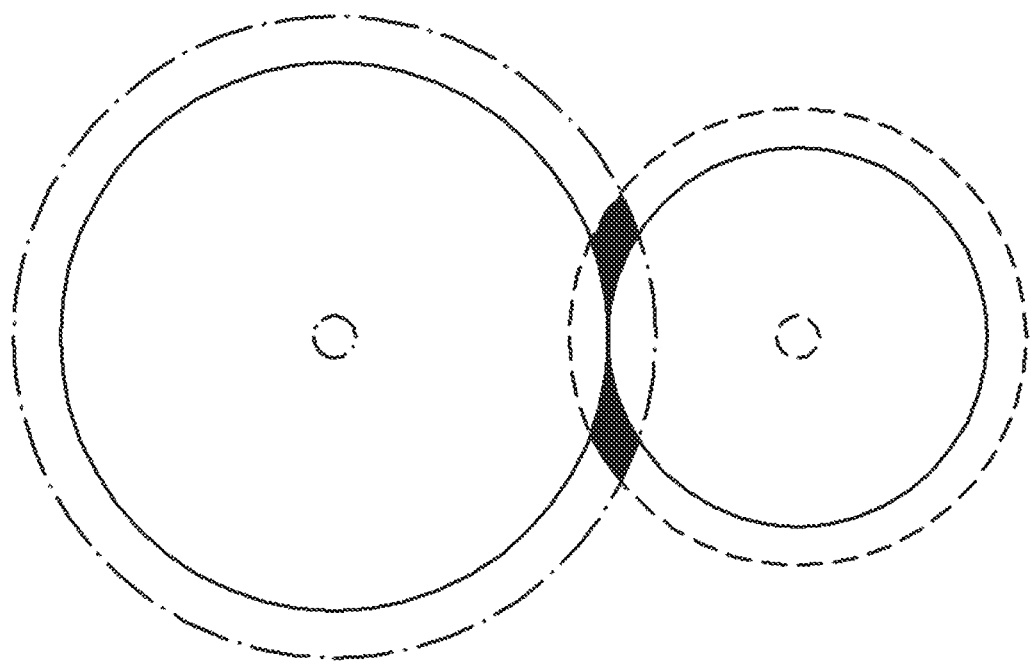
FIGS. 2A and 2B are drawings illustrating an example for describing a GPS range measurement error and an uncertainty area.
Figure 2B:
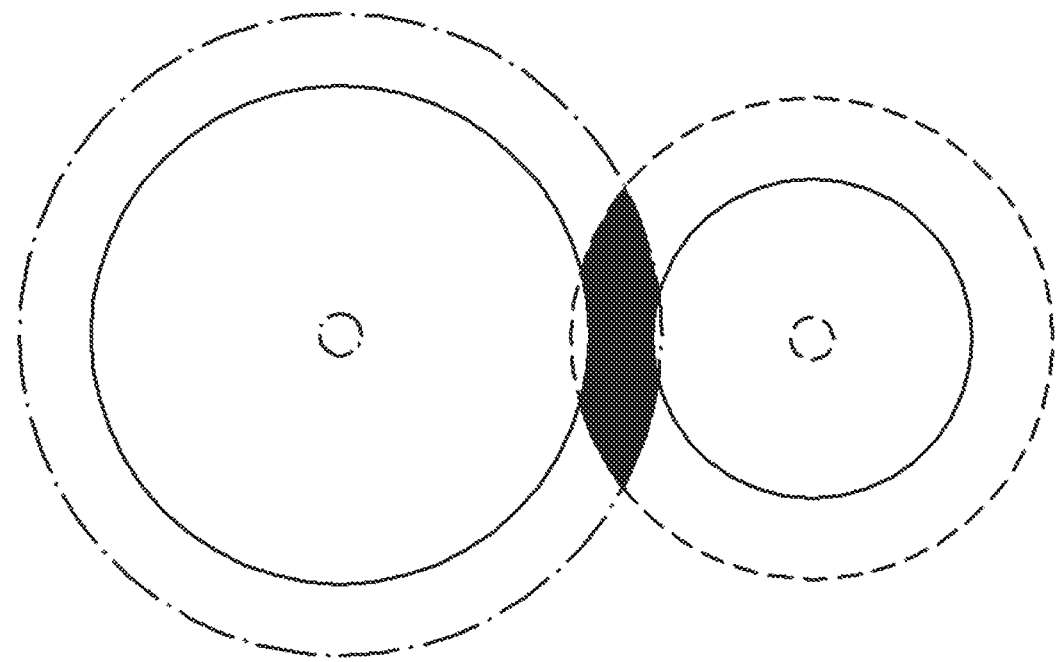
Figure 2C:
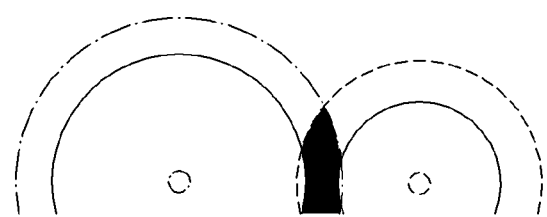

FIG. 1 is a drawing illustrating an example for describing a GPS principle. FIGS. 2A and 2B are drawings illustrating an example for describing a GPS range measurement error and an uncertainty area. In the GPS which is a radio navigation system using satellites, 31 GPS satellites currently continue transmitting signals, each of which includes a navigation message, while rotating around the earth. Because each of such satellites mounts a very accurate atomic clock and because the ground station continuously corrects time, each of the satellites has a very accurate system time. A GPS receiver may extract a navigation message including trajectory information of each of several satellites and a timestamp indicating a time when the signal is generated from GPS signals received from the several satellites to calculate its position. The GPS receiver may detect a position of each satellite using the trajectory information of each satellite, may detect a delay time taken until the signal is reached using the timestamp, and may multiply them by the velocity of light to measure a distance, thus calculating its position. When it is represented as Equation, the Equation is Equation 1 below.

$$R_i = \sqrt{(x-x_i)^2 + (y-y_i)^2 + (z-z_i)^2} + b_u \cdot c \qquad \text{[Equation 1]}$$

Herein, $R_i$ denotes the measurement range from the ith satellite including the time error, $(x_i, y_i, z_i)$ denotes geographic location coordinates of the ith satellite, $b_u$ denotes the time error between the system time of the receiver and the GPS time as the clock bias, c denotes the velocity of light, and (x, y, z) denotes the position of the receiver.

Because an error between the GPS time and the system time of the GPS receiver is included in the measured range, the GPS receiver may receive signals from a minimum of 4 or more satellites, may form a simultaneous equation using Equation 1 above, and may calculate the position (x,y,z) and the time error $b_u$ using the simultaneous equation.

As shown in FIG. 1 where Equation 1 above describes the equation system as the two-dimensional representation, the center indicates the sphere which is the position of the satellite, the radius indicates the sphere which is the corrected range for the clock bias error $R_i - b_u \cdot c$, and solving the equation system is finding the intersection of the plurality of spheres.

The GPS receiver solves the equation system to determine only one position theoretically, but there are many factors causing a range measurement error. Thus, as shown in FIGS. 2A and 2B, the solution of the equation are determined in an intersection region of the sphere. In detail, the distance between the receiver and each satellite is displayed as the radius of the sphere and an error range of the measured distance is displayed as an inner circle. The predicted position may be in a shadow area, and this area is called the area of uncertainty. A size of this area may vary with factors such as atmospheric influence, an ephemeris error, and satellite geometry.

First, the Earth's atmosphere delays the propagation of GPS signals, and this delay causes a distance measurement error. Two main layers such as the ionospheric layer and the tropospheric layer are present in the atmosphere, and these layers cause ionospheric delay and tropospheric delay. There are some mathematical ionospheric and tropospheric models usable to correct such an error. The GPS receiver applies these models to estimate and compensate for such an error. Herein, the error may fail to be perfectly corrected, and a distance error to ±3.9 m after correction may occur. As shown in FIG. 2B, the distance error may increase the uncertainty of position.

Secondly, a GPS control segment may monitor trajectories of GPS satellites and may update satellite trajectory information (e.g., ephemeris) thereof every 2 hours, but real trajectories thereof may differ from the satellite trajectory information because of the uncertainty of a solar radiation pressure model and a gravity field model. This error may result in a distance error of a maximum of ±2.0 m, and may increase the uncertainty of position as shown in FIG. 2B.

A GPS spoofer imitates and generates a real signal as much as the GPS receiver may incorrectly calculate a position and time as intended by an attacker. However, seeing the signal generation mechanism in detail, there are roughly two portions subtly different from the real signal. First, the GPS spoofer deliberately delays and generates the signal to imitate that the real GPS signal comes from a satellite about 20,000 km from the ground. In this case, to delay to some extent the signal is determined based on a distance between a position of the imitating satellite and a false position to deceive. The real GPS satellite signal is refracted and reached several times while passing through the ionospheric layer and the tropospheric layer until arriving at the ground, but the GPS spoofer mostly provide a delay (a delay time) without regard to such refraction. Some GPS spoofers support various signal transfer models, for example, Klobuchar model, Saastamoinen model, and the like, with regard to such a refractive effect, but there are inaccurate portions in such models. Thus, the delay time recognized by the GPS receiver should be varied due to such a difference, and this has an influence on distance measurement with the satellite. Finally, this has an influence on the accuracy of the GPS position. Secondly, each of most GPS spoofers generates a signal in the form of a digital baseband signal and converts the signal into a frequency of 1575.42 MHz using an analog-to-digital converter (ADC), a mixer, and the like to generate a spoofing signal. In this case, because the above-mentioned delay time is discretized according to a sampling period, an error occurs in the delay time. This has an influence on the accuracy of the GPS position.

In detail, a GPS spoofing attack is a kind of physical layer attack of transmitting a GPS spoofing signal to a GPS receiver of a victim using a GPS spoofer and allowing the victim to estimate an incorrect geographical position or an incorrect clock bias. The GPS spoofer generates a GPS signal model to simulate a genuine GPS signal and modulates an intermediate frequency (IF) spoofing signal depending on the model. However, any existing research does not investigate inaccuracy of the signal model of the GPS spoofer. An embodiment of the inventive concept is based on 1) a method where GPS spoofers model GPS signals and perform simulation and 2) the result of investigating factors causing inaccuracy.

Figure 3A:
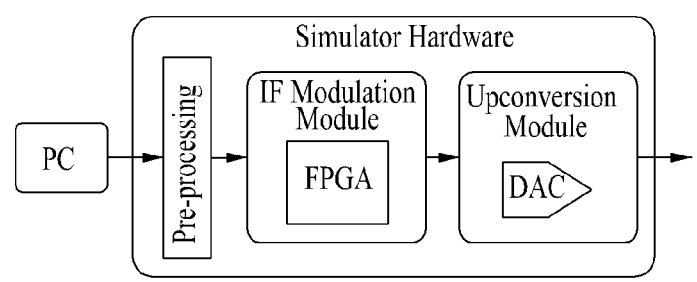
FIGS. 3A, 3B, and 3C are drawings illustrating examples for a structure of a GPS spoofer.
Figure 3B:
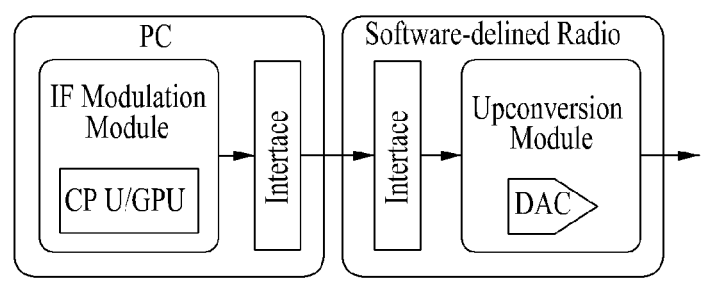
Figure 3C:
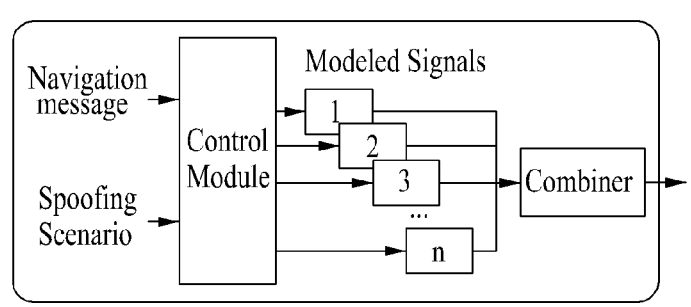

The GPS spoofer includes two types of spoofers, for example, a conventional GPS simulator and a software-defined GPS spoofer. A description will be given of the most common architecture of a conventional simulator and a software-defined spoofer with reference to FIGS. 3A and 3B. Basically, these processes may consist of digital IF spoofing signal modulation and modulation into the radio frequency signal. There is a great difference between the software-defined spoofer and the conventional simulator. For example, the software-defined spoofer uses a general processor such as a central processing unit (CPU) or a graphic processing unit (GPU), whereas the conventional simulator modulates an IF spoofing signal using dedicated field programmable gate array (FPGA) hardware. As shown in FIG. 3C, in the process of a modulation module, a control module in the modulation module calculates a signal model parameter based on a spoofing scenario including a false GPS time and position, which is a target, and a navigation message of a genuine GPS signal. A GPS signal of the ith simulation satellite may be modeled as Equation 2 below.

$$x_i(t) = A_i d_i(t-\tau_i) C_i(t-\tau_i) \sin(\theta_{c,i}) \quad \text{[Equation 2]}$$

Herein, $A_i$ denotes the amplitude of the signal, $d_i(t)$ denotes the navigation message bit, $C_i(t)$ denotes the C/A code chip value, $\theta_{c,i}$ denotes the instantaneous bit carrier phase, and $\tau_i$ denotes the modeled propagation delay. The spoofing channel deliberately delays the signal as if transmitting $\tau_i$ from the satellite to the target position to simulate the signal. Particularly, to accurately model a GPS signal, $\tau_i$ should be modeled with regard to the cause of a unique GPS error. To be more exact, $\tau_i$ may be represented as Equation 3 below.

$$\tau_i = \frac{R_i}{c} + \Delta b_i + E_i + T_i + I_i \quad \text{[Equation 3]}$$

Herein, $R_i$ denotes the theoretical range between the simulated satellite and the target position, $\Delta b_i$ denotes the satellite clock error, $E_i$ denotes the ephemeris error, $T_i$ denotes the tropospheric delay, and $I_i$ denotes the ionospheric delay. Because $E_i$, $T_i$, and $I_i$ are not deterministic parameters, they should be modeled to generate a spoofing signal similar to a genuine GPS signal. However, most GPS spoofers do not consider an ephemeris error and an atmospheric influence when generating the $\tau_i$ model. Thus, when the GPS receiver receives such a spoofing signal, there should be difference in the measured pseudorange. Some GPS spoofers apply conventional atmospheric effect models, such as the Klobuchar ionospheric model and the Saastamoinen tropospheric model, to the $\tau_i$ model, but such models are partially inaccurate.

Furthermore, there is an inaccurate model of the GPS spoofer by the discontinuity of $I_i$. A combiner in the modulation module may sample modeled signals and may combine samples to generate a digital IF spoofing signal. The digital spoofing signal may be represented as Equation 4 below.

$$x(nT) = \sum_{i=1}^{k} x_i(nT) \quad \text{[Equation 4]}$$

Herein, $x(nT)$ denotes the nth sample of the modeled signal. However, when τi is discontinuous after performing sampling, there may occur an additional range error due to this. For example, when the sampling period is 200 ns (a sampling speed of 5 MHz), there may occur a delay error of a maximum of 200 ns. This may result in a range error of a maximum of 60 m (i.e., the velocity of light×maximum discontinuous error) between the spoofed GPS satellite and the receiver. It is known that an ionospheric error which the largest error limiting the performance of satellite-based navigation is generally less than 19.6 m. Thus, this error may more seriously occur than a range error caused by the ionospheric effect, and the uncertainty of the result position may be increased when the receiver receives a spoofing signal.

To sum up, there is an inaccurate portion due to the inaccurately modeled propagation delay $I_i$ and discontinuity in a signal model of the GPS spoofer. Because such inaccuracy has an influence on the range measurement error of the GPS receiver, as shown in FIGS. 2A and 2B, the size of the uncertainty area is varied according to whether the GPS receiver receives a genuine signal or a spoofing signal.

As described above, when the spoofing signal is received, the size of the uncertainty area may be changed. Thus, the size of the uncertainty area may be used to detect a GPS spoofing attack, but it is difficult to directly measure it. Instead, because such an accuracy estimate is calculated by measuring the degree of dispersion of a GPS position output, it may be inferred using an accuracy estimation output of the common GPS receiver. In other words, GPS position accuracy is defined as a dispersion degree of a plurality of GPS position measurements measured for a short time. A numerical value indicating the dispersion degree is plural in number. For example, circular error probable (CEP) indicates the size of the radius of the circle capable of including half of the measurements, and R95 indicates the size of the radius of the circle capable of including 95% of the measurements. They are numerical values representing the dispersion degree. Recent GPS receivers may measure GPS position accuracy in the same manner as CEP and R95, which measures numerical values, and any receiver, which does not measure GPS position accuracy, may measure accuracy in the above-mentioned manner. Furthermore, the GPS receiver may measure velocity and time as well as positions, and may measure accuracy of such values in the above-mentioned manner.

Figure 4:
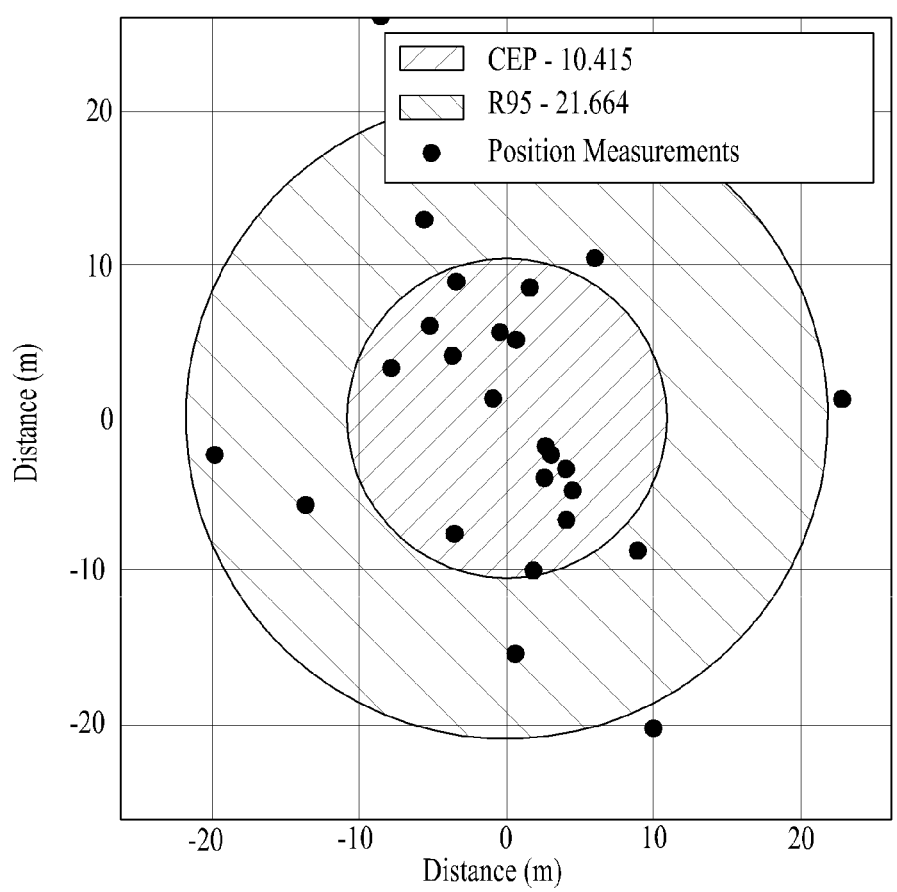
FIG. 4 is a drawing illustrating an example for describing a method for measuring accuracy of a GPS position.

FIG. 4 illustrates an example of how CEP and R95 are measured. A modern GPS receiver calculates the same type of index as CEP and R95 to estimate the accuracy of the output and outputs the calculated value as an accuracy estimate. FIG. 4 shows only position accuracy estimates. However, the GPS receiver may measure a dispersion degree of time and speed measurement to estimate time accuracy and speed accuracy.

To identify how much influence the inaccurate signal model has on an accuracy estimate, when the GPS receiver receives a genuine signal and a spoofing signal using a commercial GPS receiver and a GPS spoofer, an experiment for collecting accuracy estimates may be performed. In other words, an embodiment of the inventive concept may collect an accuracy estimate for a genuine GPS signal, and may collect an accuracy estimate for a spoofing signal by configuring a GPS spoofer to simulate genuine GPS signals of the same navigation message, time, and position.

Figure 5A:
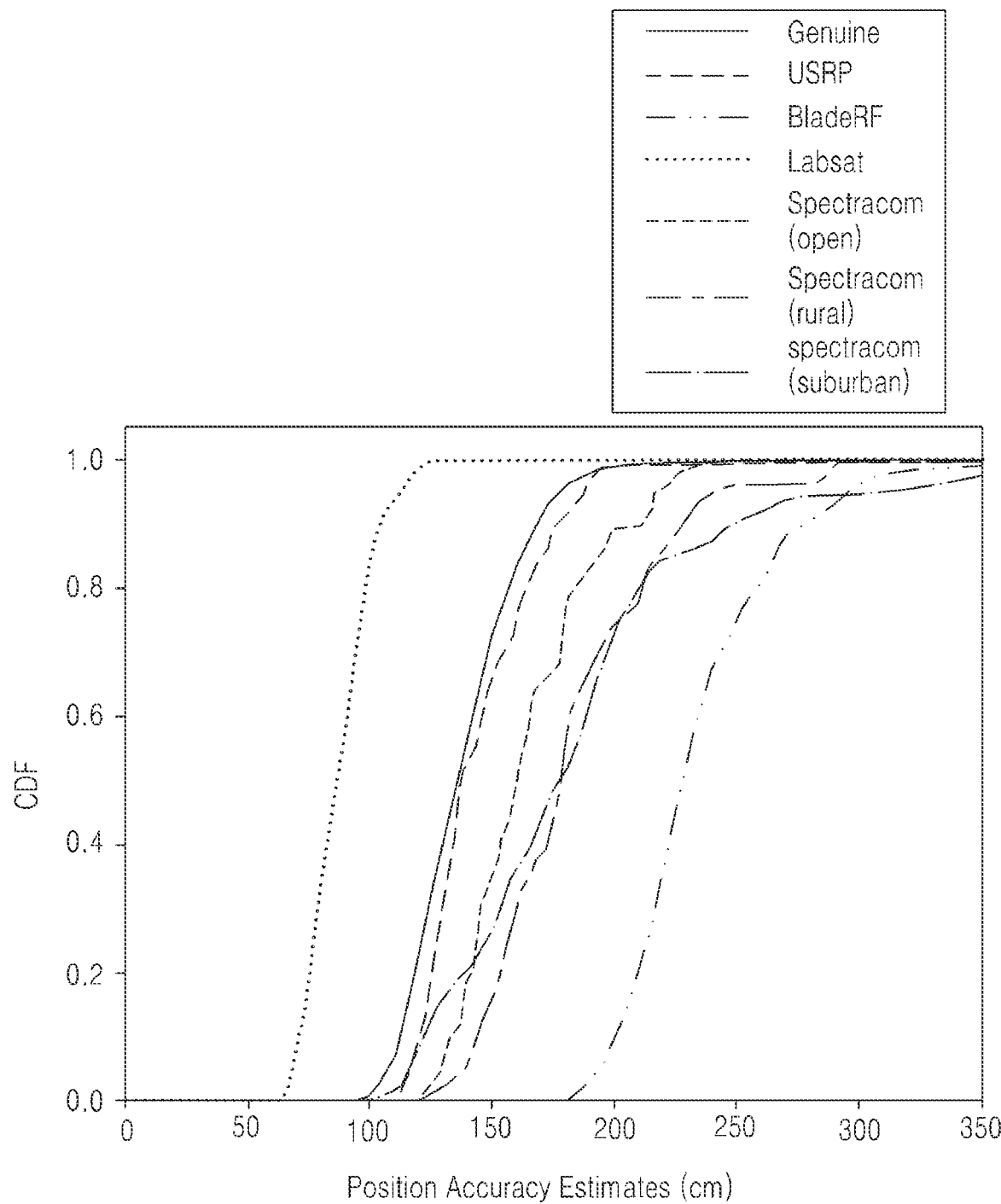
FIGS. 5A and 5B are drawings illustrating an example for a cumulative distribution function of position accuracy estimates for various signal sources and speed accuracy estimates.
Figure 5B:
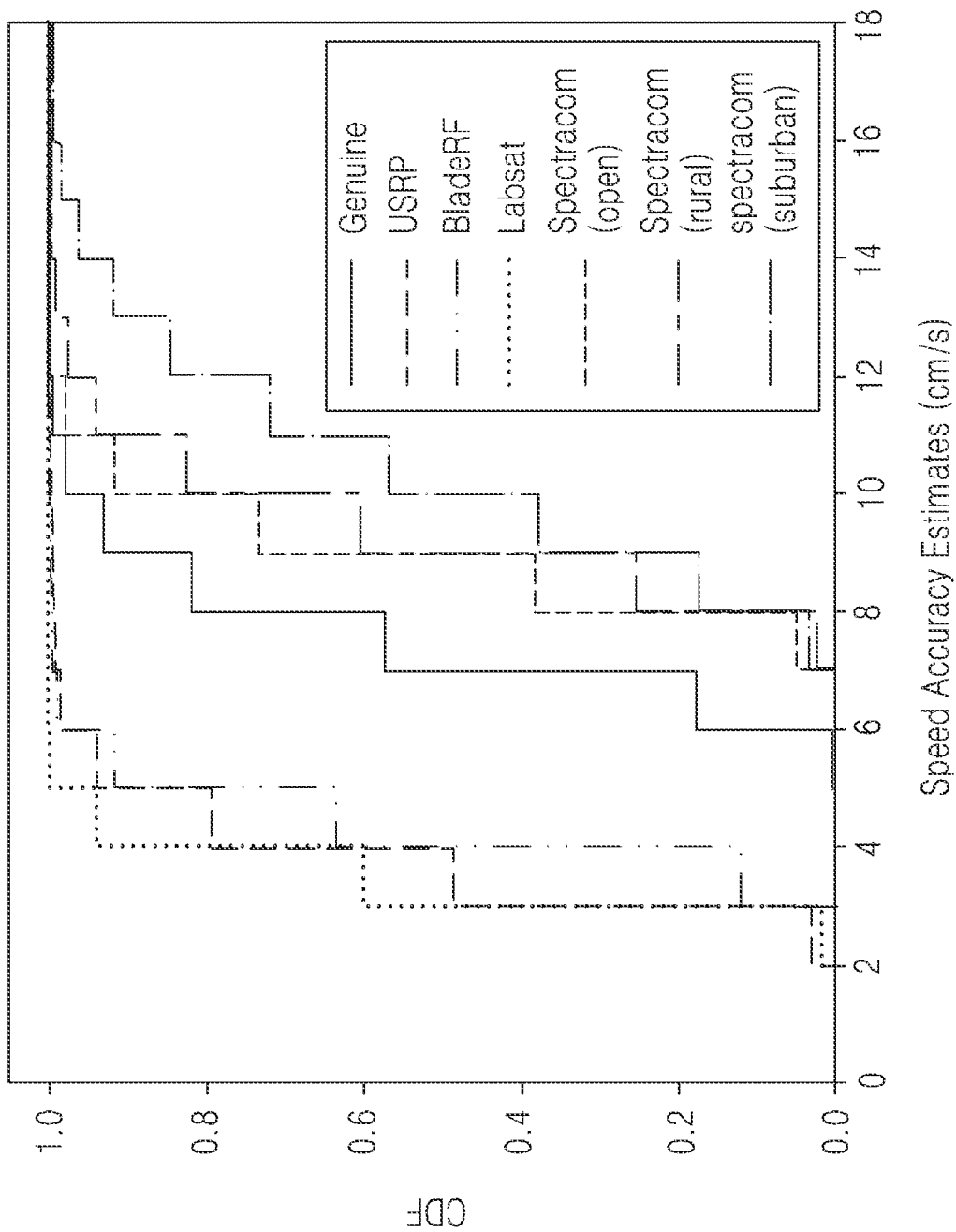

FIG. 5A shows the cumulative distribution function (CDF) of position accuracy estimates of setting of each spoofer to clearly compare and read accuracy estimates for each signal source. As seen with reference to FIG. 5A, it is shown that the distribution of position accuracy estimates for the GPS spoofing signal is sufficiently distinguished from a real GPS signal. An accuracy estimate of LabSat 3 is lower because this device does not simulate both of atmospheric influence and an ephemeris error and is lower because a distance error is very low due to a high sampling speed (16.368 MHz). Accuracy estimates of other GPS spoofers are generally higher, and it is obvious that they do not accurately model a spoofing signal in a genuine GPS signal. Although the distribution of position accuracy estimates for a real GPS signal is a little overlapped with the distribution of USRP as shown in FIG. 5A, the distribution of speed accuracy estimates may be distinguished as shown in FIG. 5B. Thus, a genuine GPS signal and a spoofing signal should be able to be distinguished from each other with regard to all accuracy estimates.

There are some advantages to use an accuracy estimation output of the common GPS receiver as a function for distinguishing the spoofing signal from the genuine signal. First, a recent GPS receiver, such as a GPS module of u-blox EVK-M8T, Swift Piksi multi GNSS module, or Qualcomm Snapdragon, provides an accuracy estimation output. Furthermore, the location API of Android and the CLLocation API of iOS provide horizontal and vertical accuracy estimates. Secondly, although a GPS receiver of a conventional GPS-dependent system does not provide such an output, the system may collect a plurality of position measurements over a short period of time, may calculate a dispersion degree of such measurements, and may calculate an accuracy estimate as shown in FIG. 4.

Attacker Model

An embodiment of the inventive concept considers a powerful attacker capable of stably transmitting a spoofing signal to a target system and accurately manipulating GPS position, speed, and time outputs of a target. An embodiment of the inventive concept assumes that the attacker tries to simulate a spoofing signal as similar as possible to the real GPS signal using a physical characteristic. An embodiment of the inventive concept assumes that attackers may generate the synchronized spoofing signal using a conventional GPS simulator or an SDR-based GPS spoofer and may make the receiver receive the spoofing signal without signal loss.

Problem Overview

Under the attacker model, the goal of an embodiment of the inventive concept is to provide a new GPS spoofer capable of being adopted to be used together with the system which uses the GPS receiver by only software update without additionally installing or correcting hardware. To this end, an embodiment of the inventive concept may convert detection of a GPS spoofing signal using a binary classification problem of detecting several accuracy estimates (position, speed, and time accuracy estimates or the like) output by the GPS receiver belong to a genuine signal class or a spoofing signal class.

Data Set Collection

GPS receiver settings: u-blox EVK-M8T is used as the GPS receiver to collect six accuracy estimates (time, frequency, horizontal, vertical, position, and speed accuracy estimates) using the laptop and RTKLIB. The receiver is configured to collect accuracy estimates every 0.2 seconds and ignore the GNSS signal except for the GPS signal.

Signal source settings: The antenna is installed on the roof to collect accuracy estimates for the genuine GPS signal, which relays the signal to the receiver. For example, accuracy estimates for the spoofing signal are collected using a conventional simulator (e.g., Spectracom GSG-6) and three software-defined spoofers (e.g., bladeRF x40, USRP 2944, and LabSat 3). An embodiment of the inventive concept may set a sampling speed to 2.5 MHz for Blade and 5 MHz for USRP to be used together with open source GPS simulation software. Spectracom GSG-6 may apply the ionospheric model and the Saastamoinen tropospheric model and may collect accuracy estimates using three open, rural, and town propagation environment models. A GPS spoofer may be set to generate a spoofing signal using various sampling speeds, propagation environment models, atmospheric models, or the like and deal with as many various attackers as possible. To learn the model with respect to only an inaccurate influence of the signal model, an embodiment of the inventive concept may be configured such that the simulated time and position of the GPS spoofer is the same as that of the genuine GPS signal collecting accuracy estimates.

Data Set Overview: Five data sets ds1, ds2, ds3, ds4, and ds5 of different days are generated. Seven subsets are included in each data set. Each subset is a set of accuracy estimates of one (the GPS satellite, bladeRF, USRP, Labsat 3, and open, rural, and town Spectracom GSG-6 propagation models) of signal sources. All subsets of each data set may be collected from the signal sharing the same navigation message. In this case, to reduce the influence of satellite geometry, accuracy estimates may be collected from each signal source for a minimum of 9 hours.

System Design

Figure 6:
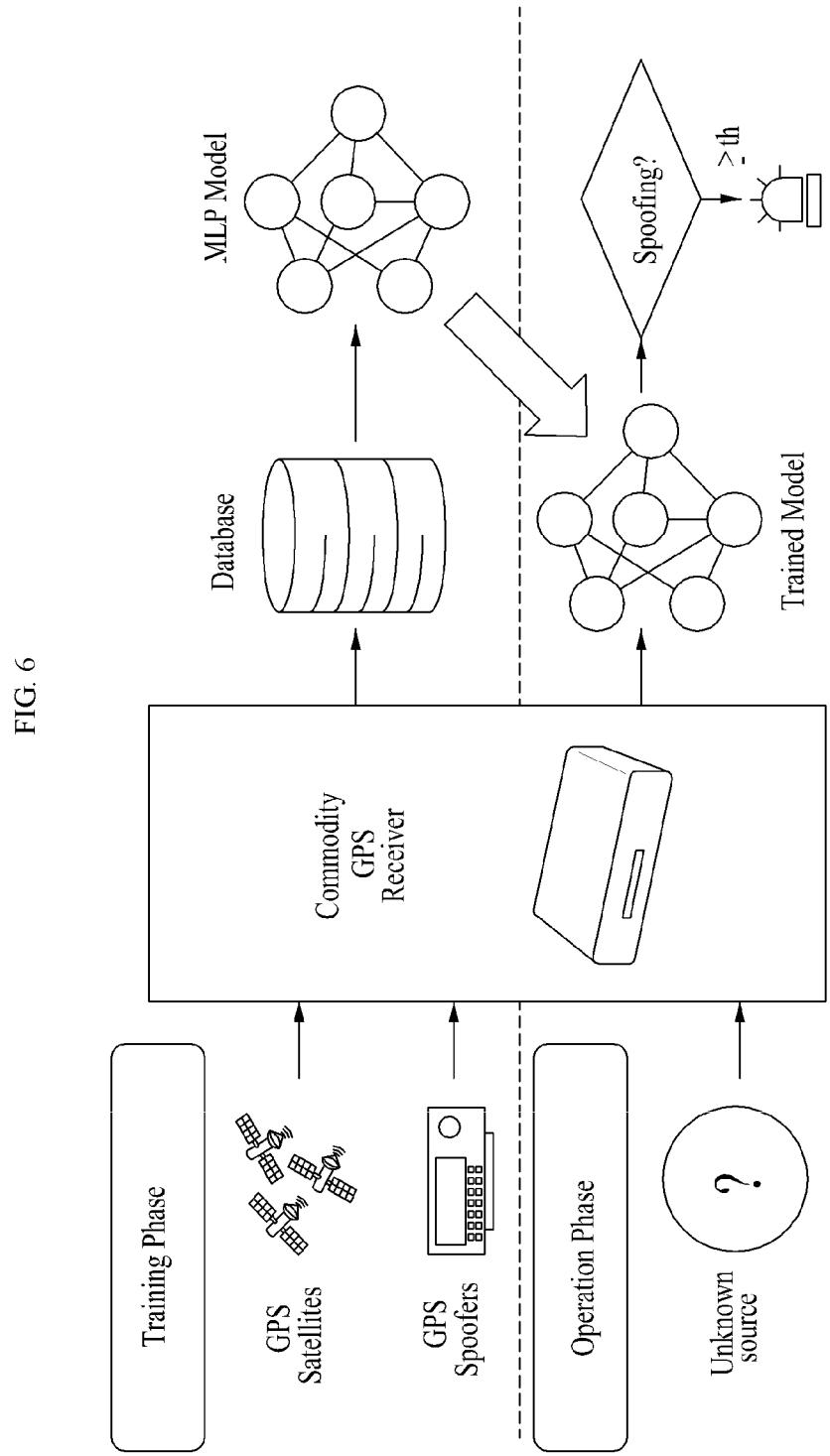
FIG. 6 is a drawing illustrating an example for describing a method for detecting a GPS spoofing attack according to an embodiment of the inventive concept.
Figure 7:
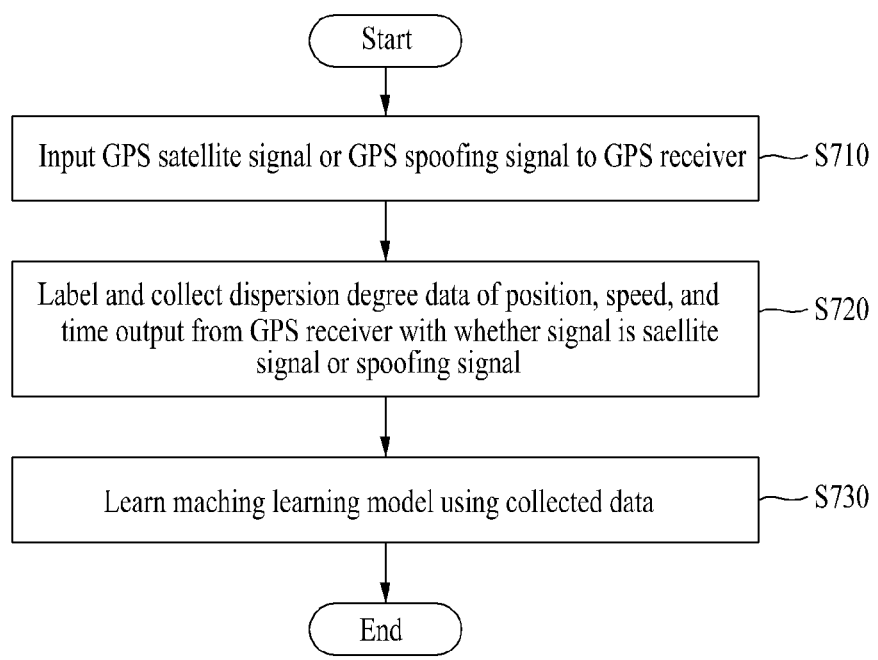
FIG. 7 is a drawing illustrating an operational flowchart of an embodiment for a learning phase in the inventive concept.
Figure 8:
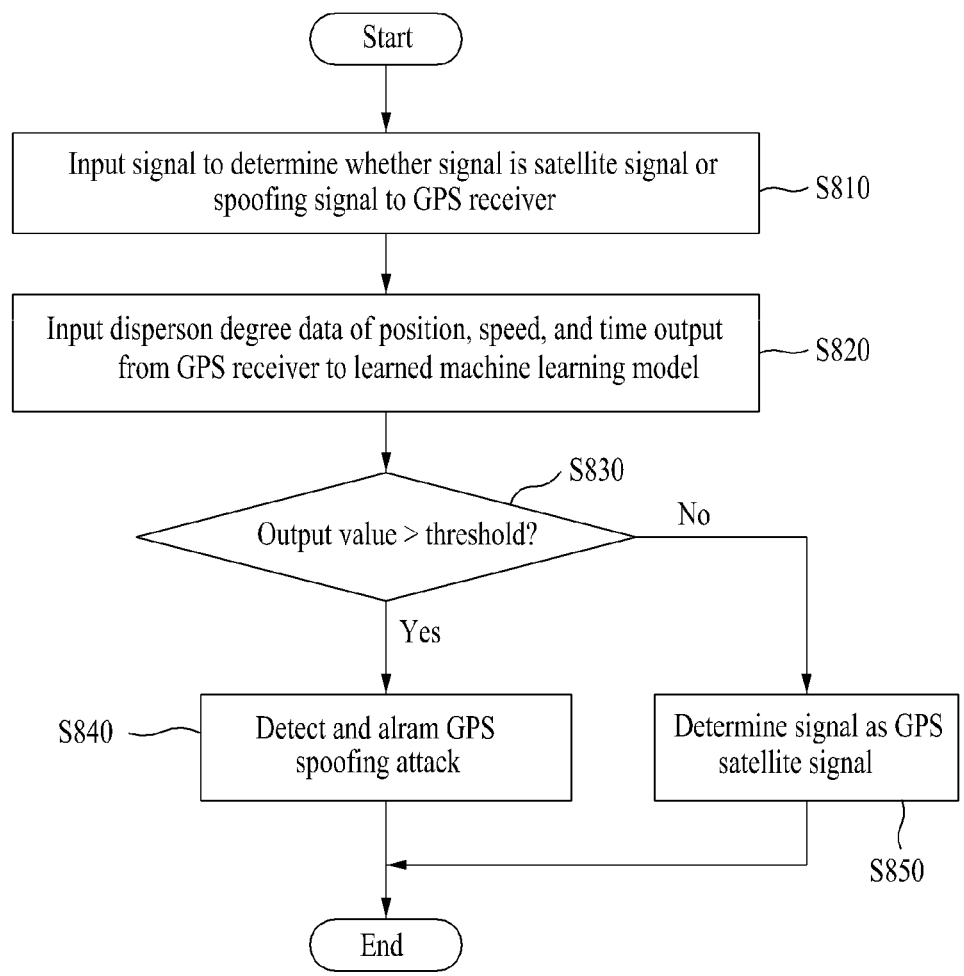
FIG. 8 is a drawing illustrating an operational flowchart of an embodiment for an operation phase in the inventive concept.

FIG. 6 is a drawing illustrating an example for describing a method for detecting a GPS spoofing attack according to an embodiment of the inventive concept. FIG. 7 is a drawing illustrating an operational flowchart of an embodiment for a learning phase in the inventive concept. FIG. 8 is a drawing illustrating an operational flowchart of an embodiment for an operation phase in the inventive concept. As shown in FIG. 6, the method according to an embodiment may include a training phase and an operation phase.

As shown in FIG. 7, in operations S710 and S720, the training phase may be to collect GPS accuracy (position accuracy, speed accuracy, time accuracy, or the like) values through an output value of a GPS receiver, for example, dispersion information (or accuracy estimate) data of position, speed, time, or the like, when inputting an output value of the GPS receiver when inputting a GPS satellite signal and various spoofing signals generated from various GPS spoofers. When the GPS receiver itself provides such values, the values may be collected. In operation S730, the learning phase is to learn a machine learning model, for example, a deep neural network (DNN), using the collected value. In other words, in the learning phase, accuracy estimates (or a dispersion degree) for a satellite signal and a spoofing signal may be collected to be stored in a database. A machine learning classifier model may be learned using the stored data. Because of using a multilayer perceptron (MLP) model, an output layer of which is the Softmax layer, the model may output a probability that the input accuracy estimate will belong to a genuine signal class and a spoofing signal class. Of course, the learning model in an embodiment of the inventive concept is not restricted or limited to the MLP model and may include another machine learning model, for example, a support vector machine (SVM), a decision tree model, a convolutional neural network (CNN) model, or the like.

When the model is sufficiently learned, the model may be loaded into the real system to move to the operation phase. An output value of the GPS receiver may be collected when the signal from an unreliable source is input to the same model of receiver. When the output value when a GPS accuracy value extracted from the output value of the GPS receiver is input to the learned machine learning model is greater than or equal to a predetermined threshold, it may be determined as an attack to generate an alarm. In this case, the threshold may be adjusted in such a manner as to make it low when it is wanted to be made more sensitively and to make it high when it is wanted to reduce an incorrect alarm as many as possible, depending on the nature of system. For example, when an accuracy estimate of the receiver is provided to the trained model in the operation phase. When a probability that the input will belong to the spoofing signal class is greater than a predetermined threshold (e.g., th=0.5), an alarm may be generated. In detail, as shown in FIG. 8, the operation phase may be to input (S810) a signal to determine whether the signal is a satellite signal or a spoofing signal to a GPS receiver, input (820) an output value of the GPS receiver, for example, dispersion information data of position, speed, or time to a learning model learned by the learning phase of FIG. 7, for example, a machining learning model, to detect a GPS spoofing attack when an output value of the machine learning model is greater than a predetermined threshold, generate (S830 and S840) an alarm for the GPS spoofing attack, and determine (S850) the signal as the GPS satellite signal when the output value of the machine learning model is less than or equal to the threshold.

Because the dispersion degree of the GPS output value varies with the position distribution and the number of GPS satellites, there is a need for learning data over a certain amount to improve the accuracy of system such that the system has constant accuracy at any time. Furthermore, the dispersion degree of the GPS output value may be greatly changed in value, because the propagation environment is not good when there are many buildings around it or in a movement situation, although the GPS satellite signal is received. Thus, an incorrect alarm may occur. To make the system have constant accuracy in such a situation, data in various propagation environments should be collected to be reflected in learning.

An embodiment of the inventive concept may use the MLP model having two hidden layers of 64 nodes and 32 nodes. The MLP model is the simplest type of neural network model. It is known that a lightweight MLP model may accomplish high accuracy when the learning data set is sufficient. A dropout technique may be applied to each hidden layer to reduce overfitting. The dropout technique may include that each node of the network is dropped out with the given probability p and that the network calculates a result using the other nodes of the learning phase. In all evaluation, the dropout probability may be corrected to 0.7 (p=0.7). To generate and learn the model, Tensorflow which is the most popular open source software library for machine learning may be used.

As such, the method according to an embodiment of the inventive concept may detect a GPS spoofing attack using a difference between output values of the GPS receiver and may have relatively high practicality by being sufficiently applicable to a conventional system in such a manner as to update software of a very simple logic without installing additional hardware or changing hardware because of operating using only the output of a conventional GPS receiver.

Furthermore, the method according to an embodiment of the inventive concept may be based on a difference in signal, which is generated due to a characteristic of the signal generation principle of the spoofer to be relatively lower in potential for bypass than other technologies. Thus, by applying the technology according to an embodiment of the inventive concept, GPS dependent systems may be safely protected from the GPS spoofing attack.

An embodiment of the inventive concept may be applied to an intelligent mobility and an unmanned vehicle, a smart grid and an intelligent network, a GPS receiver, or the like.

As described above, the method according to an embodiment of the inventive concept may detect whether there is a GPS spoofing attack by using the accuracy of the result values when the GPS receiver calculates a position, speed, time, and the like using a signal received in the GPS receiver and may be based on a difference in signal, which is generated due to a characteristic of the signal generation principle of the GPS spoofer, to be relatively lower in potential for bypass than existing technologies.

Figure 9:
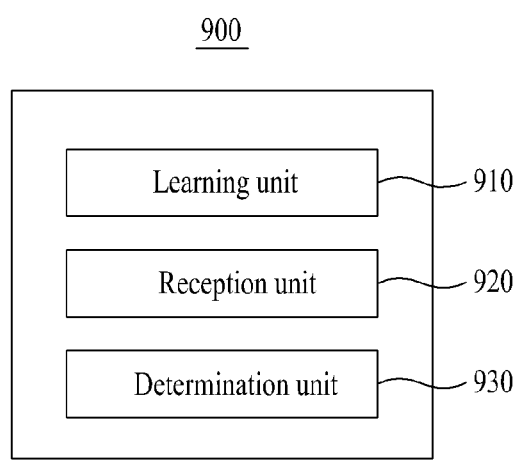
FIG. 9 is a block diagram illustrating a configuration of an apparatus for detecting a GPS spoofing attack according to an embodiment of the inventive concept.

FIG. 9 is a block diagram illustrating a configuration of an apparatus for detecting a GPS spoofing attack according to an embodiment of the inventive concept, which illustrates a conceptual configuration of an apparatus for performing the method of FIGS. 1 to 8.

Referring to FIG. 9, an apparatus 900 for detecting a GPS spoofing attack according to an embodiment of the inventive concept may include a learning unit 910, a reception unit 920, and a determination unit 930.

The learning unit 910 may label and collect dispersion degree data including a position, a speed, and a time output from a GPS receiver with whether a GPS signal is a GPS satellite signal or a GPS spoofing signal and may learn a learning model using the collected data.

Herein, the learning unit 910 may calculate dispersion degree data of a position output of the GPS receiver with respect to the GPS satellite signal and the GPS spoofing signal, may collect an accuracy estimate of the GPS receiver using the calculated dispersion degree data, and may learn the learning mode using the collected accuracy estimate.

In this case, the learning model may include a multilayer perceptron (MLP) model, an output layer of which is a Softmax layer.

The reception unit 920 may receive a GPS signal to determine whether it is a GPS spoofing signal or a GPS satellite signal.

The determination unit 930 may determine whether the GPS signal received in the reception unit 920 as the GPS satellite signal or the GPS spoofing signal using the learning model learned based on a difference between output values of the GPS receiver, that is, a learning model learned by the learning unit 910.

In this case, when the output value of the learning model for the received GPS signal is greater than a predetermined threshold, the determination unit 930 may detect a GPS spoofing attack.

It is apparent to those skilled in the art that, although the description is omitted in the apparatus of FIG. 9, the apparatus of FIG. 9 may include all details described in FIGS. 1 to 8.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit ((ALU), a digital signal processor, a microcomputer, a field programmable gate array (FPGA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be embodied in any type of machine, components, physical equipment, virtual equipment, or computer storage media or devices so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to embodiments may be implemented in the form of program instructions which may be executed through various computer means and may be recorded in computer-readable media. The computer-readable media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

According to an embodiment of the inventive concept may detect a GPS spoofing attack using a difference between output values of the GPS receiver.

An embodiment of the inventive concept may have relatively high practicality by being sufficiently applicable to a conventional system in such a manner as to update software of a very simple logic without installing additional hardware or changing hardware.

An embodiment of the inventive concept may be based on a difference in signal, which is generated due to a characteristic of the signal generation principle of the spoofer to be relatively lower in potential for bypass than other technologies. Thus, by applying the technology according to an embodiment of the inventive concept, GPS-dependent systems may be safely protected from a GPS spoofing attack.

Such an embodiment of the inventive concept is applicable to an intelligent mobility and an unmanned vehicle, a smart grid and an intelligent network, a GPS receiver, or the like. Because there is a need for accurate navigation for driving assistance and autonomous driving of the intelligent mobility and the unmanned vehicle, the intelligent mobility and the unmanned vehicle greatly should depend on the GPS. However, a system error operation and control takeover may occur when the intelligent mobility and the unmanned vehicle are vulnerable to a GPS spoofing attack, this may lead to economic damage and damage for humans. To make the intelligent mobility and the unmanned vehicle safe from a GPS spoofing attack, there is an absolute need for loading a technology capable of detecting the GPS spoofing attack. The smart grid and the intelligent network absolutely need time synchronization for substations and base stations, which are very widespread. To this end, because it is economic to perform time synchronization through accurate time information obtained through a GPS clock, many systems already depend on the GPS. However, power outage and system failures may occur when the smart grid and the intelligent network are vulnerable to the GPS spoofing attack, this may lead to enormous economic damage. Thus, to make the smart grid and the intelligent network safe from the GPS spoofing attack, there is an absolute need for loading a technology capable of detecting the GPS spoofing attack. An embodiment of the inventive concept may be sufficiently applied to a conventional system by internally providing a function capable of detecting whether there is a GPS spoofing attack in such a manner as to add a simple logic to the GPS receiver.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A method for detecting a global positioning system (GPS) spoofing attack, the method comprising:
   receiving GPS signals; and
   determining the received GPS signals as GPS satellite signals or GPS spoofing signals using a machine learning model learned based on a difference between output values of a GPS receiver; and
   generating an alarm indicating a GPS spoofing attack when the received GPS signals are determined to belong to a spoofing signal class,
   wherein the machine learning model is trained by collecting dispersion degree data for position, speed, and time output from the GPS receiver and labeling the collected dispersion degree data as originating from genuine GPS satellite signals or spoofed GPS signals, wherein the collecting includes calculating the dispersion degree data of a position output of the GPS receiver with respect to the GPS satellite signals and the GPS spoofing signals and collecting an accuracy estimate of the GPS receiver using the calculated dispersion degree data, wherein the machine learning model comprises a multilayer perceptron (MLP) model that receives the collected accuracy estimate as input and outputs a probability that the collected accuracy estimate belongs to a genuine signal class or the spoofing signal class.

2. The method of claim 1, wherein an output layer of the MLP model is a Softmax layer.

3. A method for detecting a GPS spoofing attack, the method comprising:
   receiving GPS signals; and
   determining the received GPS signals as GPS satellite signals or GPS spoofing signals using a machine learning model learned based on a difference in signal, the difference being generated due to a characteristic of a signal generation principle of a GPS spoofer,
   wherein the machine learning model is trained by collecting dispersion degree data for position, speed, and time output from a GPS receiver and labeling the collected dispersion degree data as originating from genuine GPS satellite signals or spoofed GPS signals, wherein the collecting includes calculating the dispersion degree data of a position output of the GPS receiver with respect to the GPS satellite signals and the GPS spoofing signals and collecting an accuracy estimate of the GPS receiver using the calculated dispersion degree data, wherein the machine learning model comprises a multilayer perceptron (MLP) model that receives the collected accuracy estimate as input and outputs a probability that the collected accuracy estimate belongs to a genuine signal class or a spoofing signal class, the method further comprising generating an alarm indicating a GPS spoofing attack when the received GPS signals are determined to belong to the spoofing signal class.

4. An apparatus for detecting a GPS spoofing attack, the apparatus comprising:
   a reception unit configured to receive GPS signals; and
   a determination unit configured to determine the received GPS signals as GPS satellite signals or GPS spoofing signals using a machine learning model learned based on a difference between output values of a GPS receiver and generate an alarm indicating a GPS spoofing attack when the received GPS signals are determined to belong to a spoofing signal class; and
   a training unit configured to train the machine learning model,
   wherein the training unit is configured to train the machine learning model by collecting dispersion degree data for position, speed, and time output from the GPS receiver and labeling the collected dispersion degree data as originating from genuine GPS satellite signals or spoofed GPS signals, signals, wherein the collecting includes calculating the dispersion degree data of a position output of the GPS receiver with respect to the GPS satellite signals and the GPS spoofing signals and collecting an accuracy estimate of the GPS receiver using the calculated dispersion degree data, wherein the machine learning model comprises a multilayer perceptron (MLP) model that receives the collected accuracy estimate as input and outputs a probability that the collected accuracy estimate belongs to a genuine signal class or a spoofing signal class.

5. The apparatus of claim 4, wherein an output layer of the MLP model is a Softmax layer.

* * * * *